United States Patent [19]

Schmidtke

[11] Patent Number: 5,172,555

[45] Date of Patent: Dec. 22, 1992

[54] DEVICE FOR EXPANSION OF LIQUEFIED GASES

[75] Inventor: Wolfgang Schmidtke, Munich, Fed. Rep. of Germany

[73] Assignee: Linde Aktiengesellschaft, Wiesbaden, Fed. Rep. of Germany

[21] Appl. No.: 782,145

[22] Filed: Oct. 28, 1991

[30] Foreign Application Priority Data

Oct. 26, 1990 [DE] Fed. Rep. of Germany ....... 4034076

[51] Int. Cl.$^5$ .............................................. F17C 7/02
[52] U.S. Cl. ...................................... 62/50.2; 62/52.1; 62/388
[58] Field of Search ...................... 62/50.2, 52.1, 388; 239/428.5

[56] References Cited

U.S. PATENT DOCUMENTS

| | | | |
|---|---|---|---|
| 3,109,296 | 11/1963 | Williamson | 62/52.1 X |
| 3,191,395 | 6/1965 | Maher | 62/50.2 X |
| 3,214,928 | 11/1956 | Oberdorfer | 62/64 X |
| 3,393,964 | 7/1968 | Donnelly | 62/52.1 X |
| 3,714,793 | 2/1973 | Hurt | 62/50.2 X |
| 3,861,168 | 1/1975 | Sayers | 62/388 |
| 4,399,658 | 8/1983 | Nielsen | 62/50.2 |
| 4,726,195 | 2/1988 | Klee | 62/50.2 |

*Primary Examiner*—Alan Cohan
*Attorney, Agent, or Firm*—Millen, White, Zelano & Branigan

[57] ABSTRACT

A device for expansion of liquefied gases, whereby the liquefied gases are used, for instance, as refrigerants for cooling a freezing room. For even distribution of the expanded refrigerant, the liquefied gas is supplied to expansion openings which are arranged inside a cold gas supply pipe. The cold gas supply pipe has an ejector bore hole for aspiration of secondary atmosphere into the cold gas supply pipe. In this way, the expanded refrigerant is finely distributed in the cold gas supply pipe and is mixed with secondary atmosphere.

21 Claims, 1 Drawing Sheet

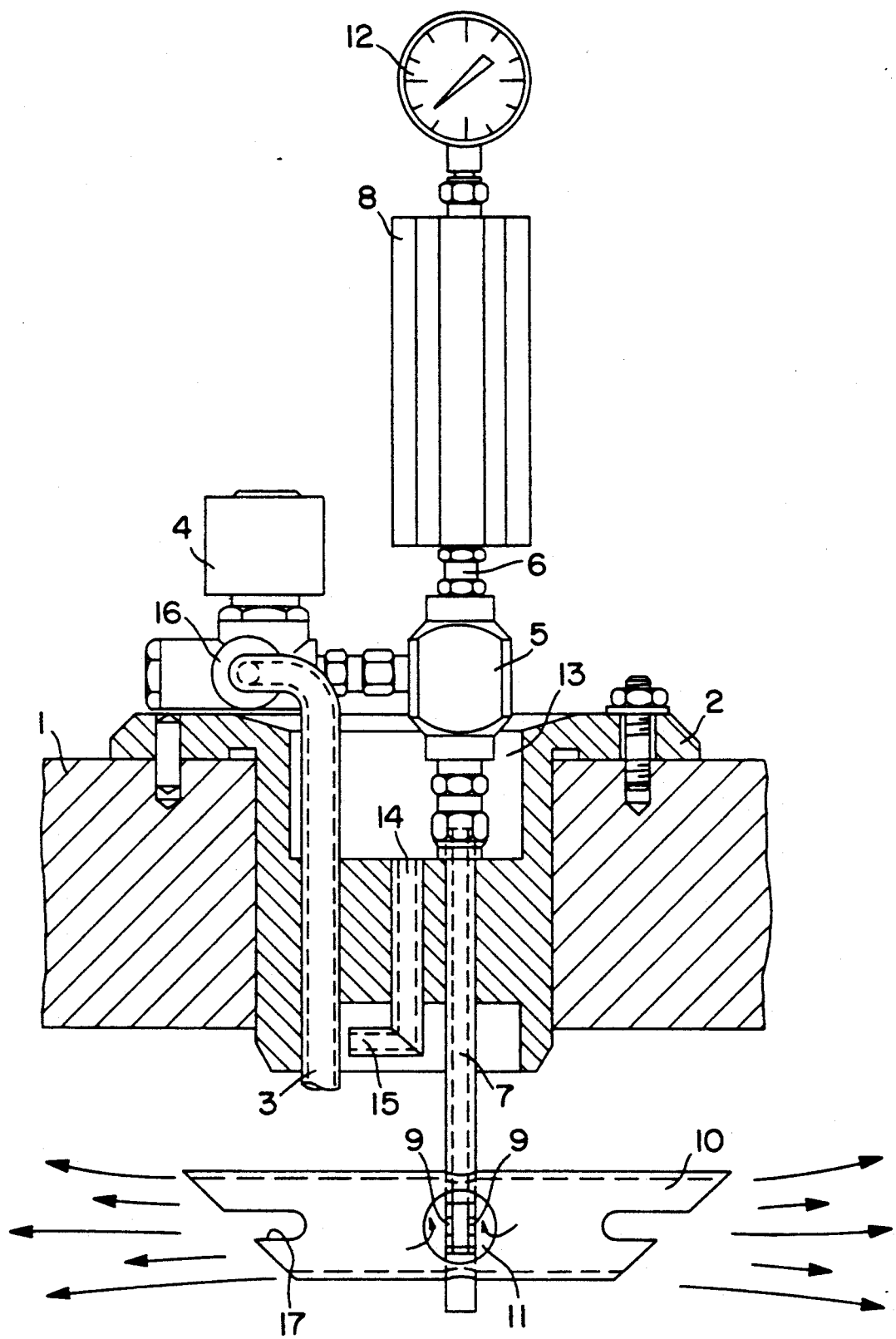

DEVICE FOR EXPANSION OF LIQUEFIED GASES

BACKGROUND OF THE INVENTION

The present invention relates to a device for expansion of a liquefied gas having liquefied gas piping and at least one connected expansion opening.

For cooling of freezing materials such as food-stuffs, synthetics, etc., or for freezing out pollutants, during exhaust gas purification, for example, multiple liquefied gases are used as refrigerants which are usually stored in a pressure vessel and expanded for cooling or freezing.

DE-PS 28 17 454 describes an arrangement for rapid freezing of liquid or solid foodstuffs, in which liquid carbon dioxide is fed into a container and expanded at the end of the tubing. This expansion causes carbon dioxide snow, from which a bed of carbon dioxide snow particles is produced in the container by stirring. The foodstuff is then introduced into the container and brought into contact with the carbon dioxide snow by stirring.

Furthermore, it is known from U.S. Pat. No. 3,214,928 to feed the foodstuffs past nozzles which spray them with liquid carbon dioxide, which then hardens into flakes of carbon dioxide snow.

The known arrangements for expansion of liquefied gases are disadvantaged in that even distribution of the expanded refrigerant can be achieved only through use of expensive construction. Besides, when the liquefied gas supply is turned off, plant components may become clogged by icing over. When the liquefied gas supply is switched on again, this clogging results in uneven distribution of the expanded refrigerant.

SUMMARY OF THE INVENTION

An object of the present invention is therefore to provide a device of the type initially nominated in such a way that expanded refrigerant is made available to meet demands in an economical reliable way.

This is achieved according to the present invention by the expansion opening being arranged inside a cold gas supply pipe which has at least one ejector bore hole in the vicinity of the expansion opening for aspirating secondary atmosphere into the cold gas supply pipe.

The expansion opening is arranged preferably in the center of gravity of the cold gas supply pipe. In order to achieve jet expansion of the generated stream of refrigerant, the cold gas supply pipe has a lateral groove advantageously on each of its ends.

The liquefied gas flows through the liquefied gas piping to the expansion opening or to the expansion openings where the stream of liquefied gas is expanded under the triple point of the liquefied gas against the atmosphere inside the cold gas supply pipe. Because of the ejector bore hole in the cold gas supply pipe, the device works as an ejector which draws secondary atmosphere into the cold gas supply pipe, finely diffuses the refrigerant produced by expansion and relays it to the consumer, a cold room or freezing room, for example. When liquid carbon dioxide is used, it becomes a question of carbon dioxide snow and carbon dioxide cold gas in the case of expanded refrigerant. The carbon dioxide snow is distributed finely in the cold gas supply pipe and mixed with the carbon dioxide cold gas as well as the aspirated secondary atmosphere. The resulting two-phase mixture is distributed evenly to the cold room or freezing room. In this way extremely fine atomization of the refrigerant is possible, as is its even distribution. The refrigerant can thus be supplied on demand to the consumer, that is, to the product to be cooled. No areas of the product are frozen excessively or insufficiently.

In order to avoid uneven distribution of the refrigerant as a result of clogging, it is proposed according to a further development of the inventive concept of the present invention that the liquefied gas piping is connected with a flow divider which divides the liquefied gas flow into two branch lines, whereby one branch line ends in a gas pressure storage tank, while the other branch line has the expansion opening for expansion of the liquefied gas.

The outcome of this arrangement is that the gas pressure storage tank is loaded when the liquid gas supply is switched on, while simultaneously liquid gas is supplied to the expansion openings for expansion purposes. After the liquid gas supply is switched off, the gas pressure storage tank, according to its storage capacity, ensures that the liquid gas still present in the branch line leading to the expansion openings is maintained in a pressure range above the triple point of the liquid gas until the liquid gas piping is completely emptied. This effectively prevents clogging of the expansion bore holes by carbon dioxide snow.

The gas pressure storage tank preferably has a gilled-pipe evaporator. Thus, sufficient pressure can be built up in the gas pressure storage tank without considerable expense on apparatus, in order to maintain the liquid gas above the triple point after switching off of the liquid gas supply. So as to ensure maintaining the necessary pressure, a pressure gauge is usefully provided, connected to the gas pressure storage tank. A magnetic valve is used preferably to switch the liquid gas supply on and off and is arranged in the liquid gas piping upstream of the flow divider.

With the device according to the present invention it is possible for expanded refrigerant to be made available according to demand at any time and without considerable expense on apparatus. Switching off the liquid gas supply at times when no refrigerant is required leads to clogging of nozzle holes, guaranteeing supply of the refrigeration plant with expanded refrigerant after the liquid gas supply is switched on again.

According to an especially preferred embodiment the liquid gas piping is installed for the most part inside the room to be cooled, that is when the invention is used in cold rooms or freezing rooms inside the cold room or freezing room, so as to minimize heat loss. By way of example, the liquid gas tank can be housed inside the cold room or freezing room or directly next to the cold room or freezing room, whereby as short as possible supply is provided from the liquid gas tank to the cold room or freezing room.

To prevent malfunctions due to condensation, it is further proposed to arrange beneath those installation components located outside the cold room or freezing room a condensation collecting chamber which has a condensation discharge pipe for drawing off condensation.

With the device according to the present invention optimization of the refrigeration supply is achieved, especially with the use of liquefied carbon dioxide. Whereas with conventional devices for expansion of liquefied carbon dioxide the problem of clogging by carbon dioxide snow may arise, the device according to the present invention enables trouble-free periodic or continuous operation. The device is space-saving and manages by using commercial components. Furthermore, assembly and repairs are made easy. Altogether, the invention offers an economical and reliable expansion device which can make available expanded refrigerant at any time according to demand.

The device according to the present invention is suited to expansion and distribution of all imaginable liquefied gases, such as liquid nitrogen, liquid oxygen, liquid hydrogen, and the like. The greatest advantages of the present invention involves the use of liquid carbon dioxide, as here what matters is reliable prevention of clogging by carbon dioxide snow and even distribution of the carbon dioxide snow and gaseous carbon dioxide as refrigerant. With the device according to the present invention, these problems are solved smoothly and without considerable expense on apparatus.

The device is provided for, among others, cold gas purging, such as of foodstuffs. Use of a cold gas/air mixture, in cold rooms or freezing rooms, for example, is also possible. The invention is also suitable for precipitation of pollutants from waste gas. Here, the waste gases are fed through a freezing room impacted by means of the expansion device according to the present invention with carbon dioxide cold gas and carbon dioxide snow particles. The pollutants freeze out from the waste gas and can be separated from the waste gas as solids, for example, by means of a cyclone. It is also possible to introduce expanded liquid gas, especially gaseous carbon dioxide and carbon dioxide snow, to fluids or particle mass flows for mass and/or energy transfer. Altogether, the invention offers a wide spectrum of use in environmental and pollution abatement technology, as well as in refrigeration technology.

BRIEF DESCRIPTION OF THE DRAWINGS

The invention will be described in greater detail hereinafter with reference to the embodiment schematically represented in the accompanying Figure.

DETAILED DESCRIPTION

The expansion device illustrated in the Figure is provided for cooling of a freezing room by means of carbon dioxide snow and carbon dioxide cold gas. Foodstuffs may be deep-frozen in the freezing room or enclosure, for example. The diagram illustrates only part of the freezing room ceiling 1. Introduced into a recess of the freezing room ceiling 1 is a grommet 2 which accommodates the expansion device. The expansion device is supplied with liquid carbon dioxide by a liquid gas pipe 3. The liquid carbon dioxide is stored in a liquid gas tank, not illustrated in the Figure, which is accommodated directly next to the freezing room. The liquid gas tank is connected by way of a supply pipe to the inside of the freezing room. The liquid gas pipe 3 is connected inside the freezing room to this supply pipe coming from the liquid gas tank and is displaced for the most part inside the freezing room to reduce heat loss. The liquid gas pipe 3 which provides a liquid conveying line, passes through the grommet 2 and terminates in a magnetic valve 4 arranged above the grommet 2, in a liquid gas storage tank 16. The liquid gas supply can be regulated by the magnetic valve 4 according to the prevailing refrigerant demand. The magnetic valve 4 is connected to a flow divider 5 which divides the liquid gas flow into two branch lines 6 and 7. The branch line 6 leads to a gas pressure storage tank 8, while the branch line or supply line 7 enters the interior of the freezing room through the grommet 2.

Located at the end of the branch line 7 are several expansion bore holes 9, through which expanded carbon dioxide expands for forming carbon dioxide snow and cold carbon dioxide gas. The expansion bore holes 9 are located in the center of gravity of a cold gas supply pipe 10 open on both sides. In the vicinity of the expansion bore holes 9, an ejector bore 11 is positioned in the cold gas supply pipe 10, through which secondary atmosphere is aspirated from the freezing room. The cold gas supply pipe 10 has on both of its ends a lateral groove 17 for jet expansion of the carbon dioxide snow and cold gas stream.

The gas pressure storage tank 8 is equipped with a gilled-pipe evaporator. With this in place, a preselected system pressure can be produced and maintained without considerable expense on apparatus by evaporation of the liquid carbon dioxide supplied to the gas pressure storage tank 8. For monitoring of the system pressure, the gas pressure storage tank 8 has a pressure gauge 12. The gas pressure storage tank 8 ensures that, after switching off of the liquid gas supply by closing of the magnetic valve 4, the liquid carbon dioxide is held in the branch line 7 in a pressure range above the triple point of carbon dioxide until it is completely emptied, whereby formation of solid carbon dioxide in the branch line 7 is avoided, as is resulting clogging of the expansion bore holes 9. Variations in pressure can be compensated for with the gas pressure storage tank 8, constantly guaranteeing the required expansion pressure.

A condensation collecting chamber 13 is embedded in the grommet 2 which receives the condensation from the installation components arranged above the freezing room ceiling 1. The condensation collecting chamber 13 has a condensation discharge pipe 14 with a siphon stopper 15.

The operational method of the device is as follows:

After the magnetic valve 4 is opened, liquid carbon dioxide, according to the pressure in the installation, flows through the flow divider 5 and the branch line 7 to the expansion bore holes 9, by which the carbon dioxide liquid stream is expanded under the triple point of carbon dioxide (5.18 bar) toward the atmosphere inside the cold gas supply pipe 10. By means of this process, arrangement and configuration of the cold gas supply pipe 10, the device works as an aspirator which draws secondary atmosphere through the accordingly arranged ejector bore 11 in from the freezing room, finely distributes the carbon dioxide snow produced by expansion and releases it into the freezing room with the carbon dioxide gas constituent as a two-phase mixture of ca. $-78°$ C. At the same time the gas pressure storage tank 8 is loaded as the magnetic valve 4 opens. After the magnetic valve 4 is closed, the gas pressure storage tank 8 maintains the liquid carbon dioxide in the branch line 7 according to its storage capacity in a pressure range above the triple point of the carbon dioxide until the liquid gas pipe 3 is completely emptied. This effectively avoids any build-up of carbon dioxide snow in the branch line 7, preventing clogging of the expansion bore holes, guaranteeing even distribution of the refrigerant after the magnetic valve 4 is reopened.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing, all temperatures are set forth uncorrected in degrees Celsius and unless otherwise indicated, all parts and percentages are by weight.

The entire disclosure of all applications, patents and publications, cited above, and of corresponding German application P 40 34 076.7, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A device for expansion of a liquefied gas having liquefied gas piping and at least one connected expansion opening, wherein the expansion opening is arranged inside a cold gas supply pipe which has first and second ends with a lateral groove at each for jet expansion and which has at least one ejector bore hole in the vicinity of the expansion opening for aspirating secondary atmosphere into the cold gas supply pipe.

2. A device as claimed in claim 1, wherein the expansion opening is arranged in the center of gravity of the cold gas supply pipe.

3. A device as claimed in claim 1, wherein the liquid gas piping is connected with a flow divider which divides the liquid gas flow into two branch lines, whereby one branch line ends in a gas pressure storage tank, while the other branch line has the expansion opening for expansion of the liquefied gas.

4. A device as claimed in claim 3, wherein the gas pressure storage tank has a gilled-pipe evaporator.

5. A device as claimed in claim 3, wherein the gas pressure storage tank has a pressure gauge.

6. A device as claimed in claim 3, wherein a shut-off device is arranged in the liquid gas piping upstream of the flow divider.

7. A device as claimed in claim 3, wherein a condensation collecting chamber which has a condensation discharge pipe for drawing off condensation is arranged downstream of the flow divider.

8. A device as claimed in claim 1, wherein the liquid gas pipe is displaced mainly inside a freezing room.

9. Apparatus for cooling an enclosed environment, the apparatus comprising:
an enclosure defining the enclosed environment, the enclosure having an opening therethrough;
a supply of liquefied cooling gas of a predetermined triple point;
a supply line connected to the supply and extending through the opening, through which supply line the liquefied cooling gas is selectively passed, the supply line having expansion holes adjacent one end thereof;
a gas distribution tube extending laterally of the supply line adjacent the expansion holes, the gas distribution tube being open at both ends and having at least one opening therein proximate the gas supply line for providing an ejector wherein the gaseous atmosphere of the environment within the enclosure mixes with the supplied gas expanding through the expansion holes;
a valve disposed between the supply line and the supply for allowing and interrupting flow to the supply line;
a liquid conveying line connected to the supply line via a valve, the liquid conveying line opening within the enclosure and draining liquefied gas from the supply line; and
a gas pressure storage tank connected to the supply line for maintaining pressure above the triple point of the gas to provide pressure in the supply line after the flow of liquefied cooling gas has been interrupted by the valve and the liquid conveying line is emptied, whereby build-up of snow in the supply line is avoided so as to prevent clogging of the expansion holes in the supply line.

10. The apparatus of claim 9, further including a condensation discharge pipe extending into the enclosure for draining condensation accumulating adjacent the supply line and liquid conveying line into the enclosure.

11. The apparatus of claim 9, wherein the gas pressure storage tank includes a gilled-pipe evaporator associated therewith.

12. The apparatus of claim 11, further including a condensation discharge pipe extending into the enclosure for draining condensation accumulating adjacent the supply line and liquid conveying line into the enclosure.

13. The apparatus of claim 9, wherein the liquefied cooling gas is carbon dioxide.

14. A device for expansion of a liquefied gas having liquefied gas piping and at least one connected expansion opening, wherein the expansion opening is arranged inside a cold gas supply pipe which has at least one ejector bore hole in the vicinity of the expansion opening for aspirating secondary atmosphere into the cold gas supply pipe, the liquid gas piping being connected with a flow divider which divides the liquid gas flow into two branch lines, whereby one branch line ends in a gas pressure storage tank while the other branch line has the expansion opening for expansion of the liquefied gas.

15. A device as claimed in claim 14, wherein the expansion opening is arranged in the center of gravity of the cold gas supply pipe.

16. A device as claimed in claim 14, wherein the cold gas supply pipe has a lateral groove on each of its ends for jet expansion.

17. A device as claimed in claim 14, wherein the gas pressure storage tank has a gilled-pipe evaporator.

18. A device as claimed in claim 15, wherein the gas pressure storage tank has a pressure gauge.

19. A device as claimed in claim 14, wherein a shut-off device is arranged in the liquid gas piping upstream of the flow divider.

20. A device as claimed in claim 14, wherein a condensation collecting chamber which has a condensation discharge pipe for drawing off condensation is arranged downstream of the flow divider.

21. A device as claimed in claim 14, wherein the liquid gas pipe is displaced mainly inside a freezing room.

* * * * *